(12) United States Patent
Huang et al.

(10) Patent No.: US 12,169,333 B2
(45) Date of Patent: Dec. 17, 2024

(54) DISPLAY PANEL COMPRISING A PLURALITY OF SUPPORT BARS HAVING ENDS THAT SEQUENTIALLY DECREASE IN LENGTH IN A DIRECTION FROM A FRAME AREA TO A DISPLAY AREA AND DISPLAY APPARATUS

(71) Applicants: Beijing BOE Display Technology Co., Ltd., Beijing (CN); BOE Technology Group Co., Ltd., Beijing (CN)

(72) Inventors: Jianhua Huang, Beijing (CN); Yingying Qu, Beijing (CN); Zhihua Sun, Beijing (CN); Yifu Chen, Beijing (CN); Lingdan Bo, Beijing (CN); Feng Qu, Beijing (CN); Xiaochun Xu, Beijing (CN); Shuming Wang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/921,321

(22) PCT Filed: May 12, 2021

(86) PCT No.: PCT/CN2021/093439
§ 371 (c)(1),
(2) Date: Oct. 25, 2022

(87) PCT Pub. No.: WO2022/001399
PCT Pub. Date: Jan. 6, 2022

(65) Prior Publication Data
US 2023/0176416 A1    Jun. 8, 2023

(30) Foreign Application Priority Data
Jun. 29, 2020 (CN) .......................... 202010605988.X

(51) Int. Cl.
*G02F 1/1335* (2006.01)
*G02F 1/1337* (2006.01)
*G02F 1/1339* (2006.01)

(52) U.S. Cl.
CPC .. *G02F 1/133514* (2013.01); *G02F 1/133512* (2013.01); *G02F 1/1337* (2013.01); *G02F 1/13394* (2013.01)

(58) Field of Classification Search
None
See application file for complete search history.

(56) References Cited

U.S. PATENT DOCUMENTS

| | | | | |
|---|---|---|---|---|
| 2009/0009698 | A1* | 1/2009 | Moon | G02F 1/1339 349/106 |
| 2014/0118676 | A1* | 5/2014 | Liang | G02F 1/1339 349/153 |

(Continued)

FOREIGN PATENT DOCUMENTS

| | | | | |
|---|---|---|---|---|
| CN | 104730756 A | | 6/2015 | |
| CN | 105068327 A | * | 11/2015 | ....... G02F 1/133345 |

(Continued)

OTHER PUBLICATIONS

CN202010605988.X first office action.
(Continued)

*Primary Examiner* — Paul C Lee
(74) *Attorney, Agent, or Firm* — IPro, PLLC

(57) ABSTRACT

Provided are a display panel and a display apparatus. The display panel comprises: a first substrate and a second substrate that are arranged opposite each other, wherein a display area and a frame area surrounding the display area are provided between the second substrate and the first substrate; a color resistance structure that is located in the frame area on the side of the second substrate facing the first substrate and surrounds the display area, wherein the color (Continued)

resistance structure comprises a first black matrix and a first color resistance portion arranged in a stacked manner; and a plurality of support bars that surround the display area, wherein each of the support bars fills a space between the color resistance structure and the first substrate.

18 Claims, 6 Drawing Sheets

(56) References Cited

U.S. PATENT DOCUMENTS

2017/0075180 A1    3/2017  Wang et al.
2018/0364506 A1*  12/2018  Kao ...................... G02F 1/1337

FOREIGN PATENT DOCUMENTS

| CN | 106707633 A | * | 5/2017 | ........... G02F 1/1339 |
| CN | 107942579 A | | 4/2018 | |
| CN | 110716342 A | | 1/2020 | |
| CN | 110824786 A | * | 2/2020 | ....... G02F 1/133512 |
| KR | 20130025219 A | | 3/2013 | |
| TW | 567380 B | | 12/2003 | |

OTHER PUBLICATIONS

CN202010605988.X second office action.
CN202010605988.X Decision of Rejection.
PCT/CN2021/093439 international search report.

* cited by examiner

DISPLAY PANEL COMPRISING A PLURALITY OF SUPPORT BARS HAVING ENDS THAT SEQUENTIALLY DECREASE IN LENGTH IN A DIRECTION FROM A FRAME AREA TO A DISPLAY AREA AND DISPLAY APPARATUS

CROSS REFERENCE TO RELATED APPLICATIONS

The application is a US National Stage of International Application No. PCT/CN2021/093439, filed on May 12, 2021, which claims the benefit of priority to Chinese Patent Application 202010605988.X, filed with the China National Intellectual Property Administration on Jun. 29, 2020 and entitled "DISPLAY PANEL AND DISPLAY APPARATUS", which is incorporated in its entirety herein by reference.

FIELD

The disclosure relates to the technical field of display, and in particular to a display panel and a display apparatus.

BACKGROUND

Liquid crystal displays (LCDs), which have gradually replaced traditional cathode ray tube displays (CRTs) in some applications due to advantages of low radiation, small size and low power consumption, are widely applied to notebook computers, personal digital assistants (PDAs), flat panel televisions, mobile phones, etc.

SUMMARY

The present disclosure provides a display panel. The display panel includes: a first substrate and a second substrate opposite to each other, where a display area and a frame area surrounding the display area are arranged between the second substrate and the first substrate; a color resist structure in the frame area on a side of the second substrate facing the first substrate and surrounding the display area, where the color resist structure includes a first black matrix and a first color resist portion arranged in stack; and a plurality of support bars surrounding the display area, where each of the support bars stands between the color resist structure and the first substrate.

In some embodiments, lengths of the support bars in a first direction sequentially decrease in a direction from the frame area to the display area.

In some embodiments, the support bars include a plurality of support bar groups sequentially arranged in the first direction, and the support bars of every two adjacent support bar groups are arranged alternatively in the first direction.

In some embodiments, the plurality of support bars surrounding the display area are interrupted at corners of the frame area.

In some embodiments, the first color resist portion is of an integrated single-color structure.

In some embodiments, the first color resist portion includes: a plurality of different single-color color resist portions sequentially arranged and in connection.

In some embodiments, an alignment film for alignment in a first direction is arranged between a layer with the first color resist portion and a layer with the support bars. A length of each support bar in the first direction is greater than that in a direction perpendicular to the first direction.

In some embodiments, the side of the second substrate facing the first substrate is provided with a plurality of first auxiliary spacers in the display area; and the support bars and the first auxiliary spacers are located in the same layer and made of the same material.

In some embodiments, the second substrate is further provided with a plurality of second color resist portions in the same layer as the first color resist portion and between an area in which the first color resist portion is located and the display area, second black matrices between adjacent second color resist portions, and second auxiliary spacers on sides of the second color resist portions facing the first substrate. Orthographic projections of the second black matrices on the first substrate cover orthographic projections of the second auxiliary spacers on the first substrate.

In some embodiments, the second auxiliary spacers and the first auxiliary spacers are located in the same layer and made of the same material.

In some embodiments, the side of the second substrate facing the first substrate is provided a plurality of main spacers in the display area; the side of the second substrate facing the first substrate is provided with a barrier wall surrounding the first color resist portion in the frame area, and the barrier wall is interrupted at corners; and the barrier wall and the main spacers are located in the same layer and made of the same material.

In some embodiments, a minimum length of the support bar adjacent to the barrier wall in the first direction is greater than a maximum length of the main spacer in the first direction.

In some embodiments, the frame area between the second substrate and the first substrate is further provided with a sealant surrounding the barrier wall.

In some embodiments, a planarization layer is arranged between the layer with the first color resist portion and a layer with the alignment film.

In some embodiments, orthographic projections of the support bars on the first substrate each is located in an area in which single-layer metal of the first substrate is located; or orthographic projections of the support bars on the first substrate each is located in an area in which stacked metal of the first substrate is located.

An embodiment of the present disclosure further provides a display apparatus. The display apparatus includes the display panel provided in an embodiment of the present disclosure.

DETAILED DESCRIPTION

In order to make the objectives, technical solutions, and advantages of the embodiments of the present disclosure more clear, the technical solutions of the embodiments of the present disclosure will be clearly and completely described below in combination with the accompanying drawings in the embodiments of the present disclosure. Obviously, the embodiments described are merely some rather than all of the embodiments of the present disclosure. On the basis of the described embodiments of the present disclosure, all other embodiments obtained by a person of ordinary skill in the art without making inventive efforts fall within the scope of protection of the present disclosure.

Unless defined otherwise, technical or scientific terms used in the present disclosure should be of ordinary meaning as understood by a person of ordinary skill in the art to which the present disclosure pertains. Words "first", "second", etc. used in the present disclosure do not denote any order, quantity or importance, but are merely used to distinguish between different components. Word "comprising", "encompassing" or the like is intended to mean that an element or item in front of the word encompasses elements or items that present behind the word and equivalents thereof, but does not exclude other elements or items. Word "connection", "connected" or the like is not limited to physical or mechanical connections, but may include an electrical connection, whether direct or indirect. "Upper", "lower", "left", "right", etc. are merely used to indicate a relative position relation, which may also change accordingly when an absolute position of a described object changes.

To keep the following description of the embodiments of the present disclosure clear and concise, the detailed descriptions of known functions and components are omitted from the present disclosure.

In a design of a conventional display panel, a barrier wall (polystyrene (PS) wall) is arranged in a peripheral area outside a display area (AA area), to ensure peripheral support. However, in a design of a conventional PS wall, a gap between an upper substrate and a lower substrate in the peripheral area is relatively large. When the peripheral area is deformed under stress, the peripheral support is weak, a deformation quantity is large, and a problem of light leakage in the peripheral area may occur.

Figure 1:
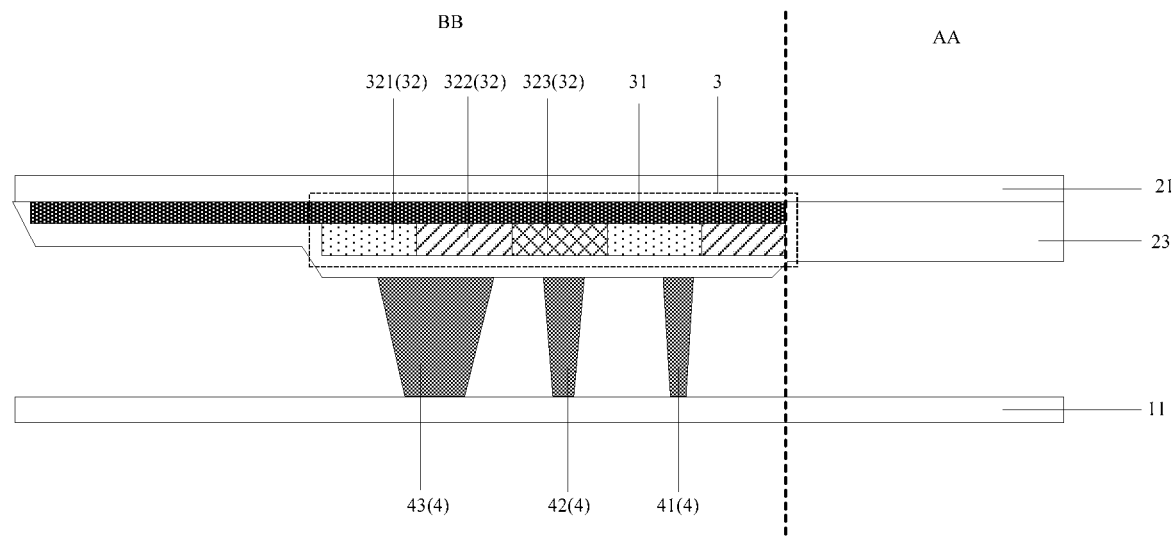
FIG. 1 is a schematic sectional view of a display panel according to an embodiment of the present disclosure.
Figure 2:
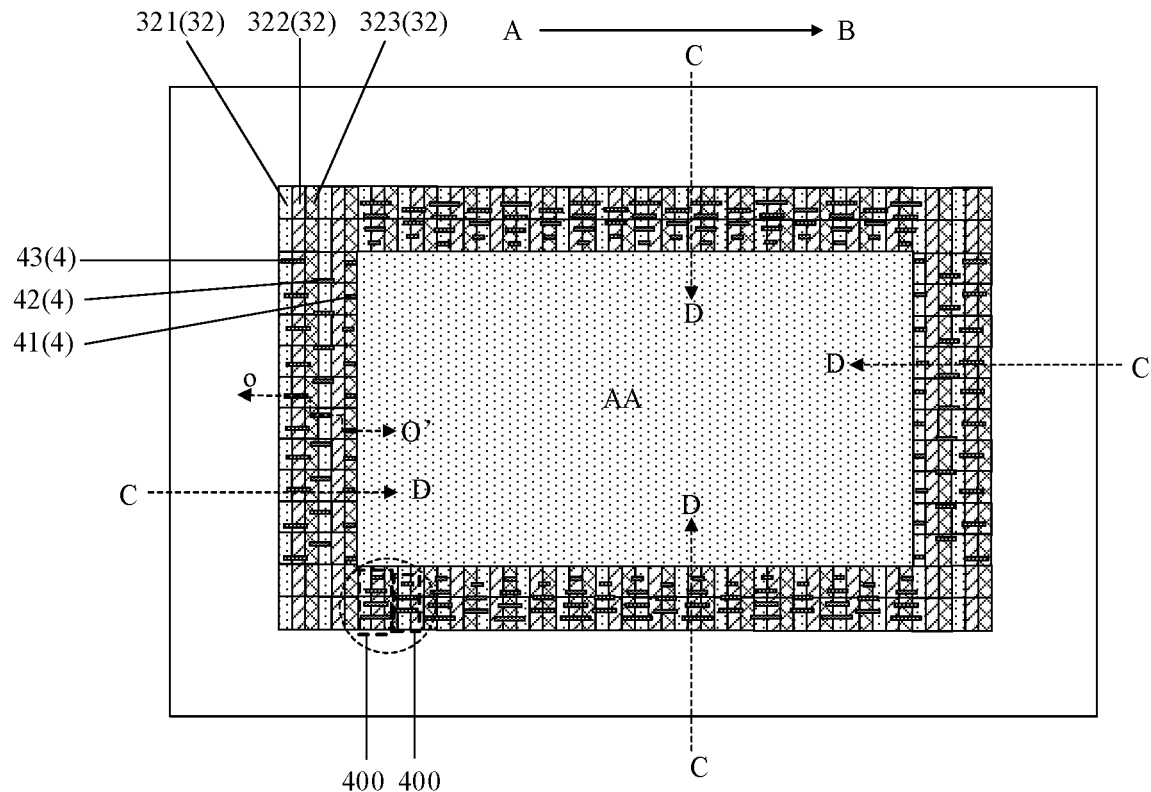
FIG. 2 is a schematic top view of a display panel according to an embodiment of the present disclosure.

On the basis of this, with reference to FIGS. 1 and 2, FIG. 1 being a sectional view of the display along the line OO' in FIG. 2, an embodiment of the present disclosure provides a display panel. The display panel includes:

a first substrate 11 and a second substrate 21 that are arranged opposite to each other, where a display area AA and a frame area BB surrounding the display area AA are provided between the second substrate 21 and the first substrate 11;

a color resist structure 3 located in the frame area BB and on a side of the second substrate 21 facing the first substrate 11 and surrounding the display area AA, where the color resist structure 3 includes a first black matrix 31 and a first color resist portion 32 arranged in stack; and a plurality of support bars 4 surrounding the display area AA, where each of the support bars 4 stand between the color resist structure 3 and the first substrate 11.

In an embodiment of the present disclosure, the frame area BB is provided with the color resist structure 3 surrounding the display area AA, the color resist structure 3 includes the first black matrix 31 and the first color resist portion 32 arranged in stack, and each of the support bars 4 stands between the color resist structure 3 and the first substrate 11, such that a height of each support bar 4 in the frame area BB and a height of the first black matrix 31 and a height of the first color resist portion 32 are added, so as to solve the problem of lack of effective support due to a gap between the first substrate 11 and the second substrate 21 in the frame area BB being large. In the case of a conventional display panel, when a barrier wall in a frame area is used for support, the barrier wall in the frame area and main spacers in a display area are integrally formed and have the same height, but the main spacers in the display area and the barrier wall in the frame area are at different positions (distribution of a film layer at different positions is different). Thus, a second substrate may be in contact with a first substrate by means of the main spacers in the display area to effectively support display, but the second substrate may not be in contact with the first substrate by means of the barrier wall in the frame area such that the frame area may not be effectively supported, and further the frame area will be deformed under stress, thereby causing a problem of light leakage. Compared with the conventional display panel, the display panel in an embodiment of the present disclosure allows the effective support in the frame area by arranging the color resist structure and the support bars in the frame area, and therefore the problem of light leakage in the peripheral area of the display panel is solved.

In some embodiments, with reference to FIG. 1, a planarization layer 23 is further disposed between the color resist structure 3 and the support bars 4.

It should be noted that in an embodiment of the present disclosure, the color resist structure 3 includes the first black matrix 31 and the first color resist portion 32 arranged in stack, and each of the support bars 4 stands between the color resist structure 3 and the first substrate 11, that is, since the frame area BB is not used for display, an orthographic projection of the first color resist portion 32 on the first substrate 11 may cover orthographic projections of the support bars 4 on the first substrate 11, and the first color resist portion and the support bars may be arranged right opposite to each other in a direction perpendicular to the first substrate 11. The first color resist portion 32 and the support bars 4 are arranged in a mode different from the color resists (such as a red color resist portion, a green color resist portion or a blue color resist portion) and the spacers (the main spacers or the auxiliary spacers) in the display area AA. In the display area AA, positions of the color resists are required to be used for display, thus, the orthographic projections of the spacers in the display area AA on the first substrate 11 and the orthographic projections of the color resists on the first substrate are required to be arranged alternatively, so as to prevent the spacers from affecting display.

In some embodiments, the display panel may be a liquid crystal display panel. The second substrate 21 may be a color film substrate, the first substrate 11 may be an array substrate, the color resist structure 3 is mad on the color film substrate, and the support bars 4 may be made on the second substrate 21. That is, during manufacturing, the color resist structure 3 and the support bars 4 are made on the color film substrate, and then the color film substrate with the support bars 4 and the color resist structure 3 are aligned with the array substrate. Alternatively, when the color resist structure 3 is on the color film substrate, the support bars 4 may be on the array substrate, that is, during manufacturing, the color resist structure 3 is made on the color film substrate, the support bars 4 are made on the array substrate, and then the color film substrate with the color resist structure 3 is aligned with the array substrate with the support bars 4. Or, the second substrate 21 may be an array substrate, the first substrate 11 may be a color film substrate, the color resist structure 3 is on the array substrate, and the support bars 4 may be on the array substrate. During manufacturing, the array substrate with the support bars 4 and the color resist structure 3 is aligned with the color film substrate. Alternatively, the color resist structure 3 is on the array substrate, the support bars 4 may be on the color film substrate. During manufacturing, the color resist structure 3 is made on the array substrate, the support bars 4 are made on the color film substrate, and then the color film substrate with the support bars 4 is aligned with the array substrate with the color resist structure 3.

Figure 3:
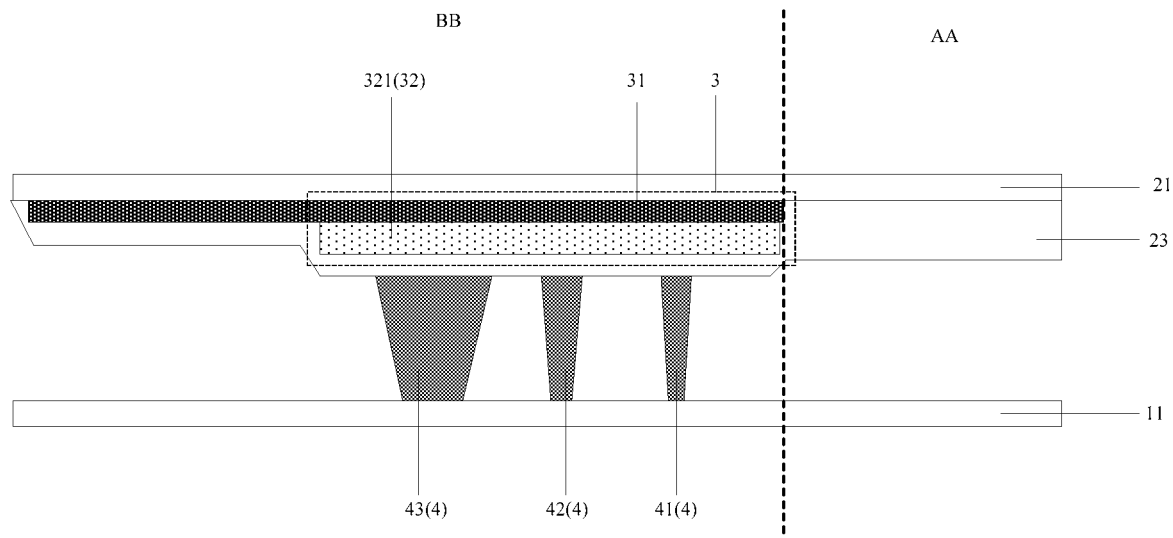
FIG. 3 is a schematic diagram of a display panel with a first color resist portion being of an integrated structure according to an embodiment of the present disclosure.

In some embodiments, with reference to FIG. 3, the first color resist portion 32 is of an integrated structure in single-color. A color of the color resist structure 3 may be the same as one color of a color resist film layer in the display area AA. That is, for example, the display area AA is generally provided with a color resist film layer, and the color resist film layer includes a red color resist portion, a green color resist portion and a blue color resist portion. In an embodiment of the present disclosure, the first color resist portion 32 may be an integrated red color resist portion 321, the first color resist portion 32 may be an integrated green color resist, or the first color resist portion 32 may be an integrated blue color resist. In an embodiment of the present disclosure, the first color resist portion 32 is of an integrated single-color structure such that the first color resist portion 32 in the frame area BB is not required to be patterned, and a process of making a display panel is simplified while a problem of peripheral light leakage is solved.

In some embodiments, with reference to FIGS. 1 and 2, the first color resist portion 32 includes: a plurality of different single-color color resist portions sequentially arranged in a connected manner, for example, includes a red color resist portion 321, a green color resist portion 322 and a blue color resist portion 323 that are sequentially connected. In some embodiments, the plurality of single-color color resist portions in the frame area BB may be integrally formed when the color resists in the display area AA is made. In an embodiment of the present disclosure, the first color resist portion 32 may be a composite structure including a plurality of single-color color resist portions, but all the single-color color resist portions are sequentially connected and closely arranged, and effectively overlap the support bars 4, so as to support the first substrate 11 and the second substrate 21 in the frame area BB.

Figure 4:
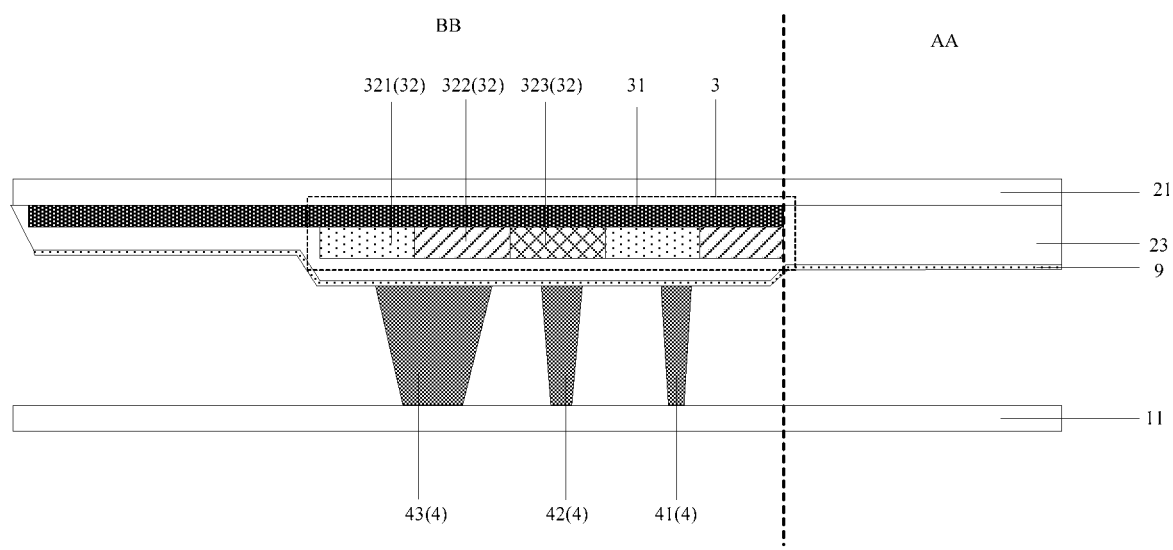
FIG. 4 is a schematic diagram of a display panel including an alignment film layer according to an embodiment of the present disclosure.

In some embodiments, with reference to FIGS. 2 and 4, an alignment film 9 for alignment in a first direction AB is disposed between a layer with the first color resist portion 32 and a layer with the support bars 4. A length of each support bar 4 in the first direction AB is greater than that in a direction perpendicular to the first direction AB, that is, the support bar is elongated. In an embodiment of the present disclosure, the length of each support bar 4 in the first direction AB is greater than that of the support bar in the direction perpendicular to the first direction AB, that is, the situation that when the alignment film 9 is used for alignment, due to blocking of the support bars 4, an alignment direction of the alignment film 9 surrounding the support bars 4 is affected, and further liquid crystal arrangement surrounding the support bars 4 may be affected, thereby affecting display is avoided. Moreover, the support bar 4 is elongated, such that in the situation that influences on alignment of the alignment film 9 may be reduced, the support bar 4 may have a larger size compared with that in a cylindrical, so as to strongly support the frame area.

In some embodiments, with reference to FIG. 2, in a direction from the frame area BB to the display area AA (that is, a direction indicated by an arrow CD in FIG. 2), lengths of the support bars 4 in the first direction AB are sequentially reduced. For example, a left frame in FIG. 2 is taken as an example, in a direction from right to left, the support bars 4 include a first column of support bars, a second column of support bars, and a third column of support bars that are sequentially distributed. The first column of support bars include a plurality of first support bars 41, the second column of support bars include a plurality of second support bars 42, and the third column of support bars include a plurality of third support bars 43. In the direction from the frame area BB to the display area AA, a length of each third support bar 43 in the first direction AB is greater than that of each second support bar 42 in the first direction AB, and a length of each second support bars 42 in the first direction AB is greater than that of each third support bar 43 in the first direction AB. In an embodiment of the present disclosure, an extending length of the support bar 4 close to the display area AA is less than that of the support bar 4 away from the display area AA such that influences of arrangement of the support bars 4 on the display area AA may be reduced (for example, an influence that arrangement of the support bar 4 blocks the alignment of alignment film 9, thereby affecting effective alignment), and in a direction away from the display area AA, lengths of the support bars 4 are increased such that effective support for the frame area BB may be improved.

Figure 5:
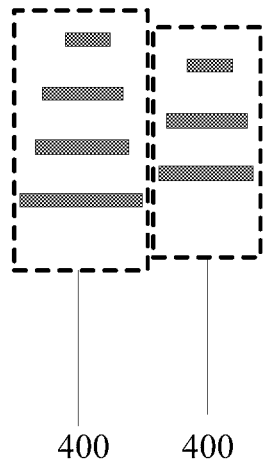
FIG. 5 is a schematic enlarged view of the structure shown in a circle in a dotted line in FIG. 2.

In some embodiments, with reference to FIGS. 2 and 5, FIG. 5 being a schematic enlarged view of support bars 4 at a dotted line quadrangle in FIG. 2, the support bars 4 include a plurality of support bar groups 400 sequentially arranged in the first direction AB, and the support bars 4 of every two adjacent support bar groups 400 are arranged alternatively in the first direction AB. In some embodiments, with reference to FIG. 5, each support bar 4 of the right support bar group 400 corresponds to a gap between two adjacent support bars 4 of the left support bar group 400. In an embodiment of the present disclosure, the support bars 4 of two adjacent support bar groups 400 are arranged alternatively in the first direction AB such that a blocking influence of the support bars 4 on fluidity of subsequently formed liquid crystal in the same direction may be reduced, and effective filling of the liquid crystal in each position may be facilitated. Certainly, it can be understood that FIG. 5 is merely a schematic distribution diagram of some support bars 4 at a lower frame in schematic diagram FIG. 2, and for the support bars 4 at other frames, the support bars 4 of every two adjacent support bar groups 400 are also arranged in a staggered manner in the first direction AB.

In some embodiments, with reference to FIG. 2, the distribution of the plurality of support bars 4 surrounding the display area AA are interrupted at corners of the frame area BB, that is, no support bars is arranged at the corners of the frame area BB. Since it is difficult for the liquid crystal to flow to the corners compared with other areas, support bars are not arranged at the corners of the frame area BB, blocking of the liquid crystal flows to the corners by the support bars may be avoided, difficulty of the liquid crystal flowing to the corners may be reduced, and therefore various positions may be filled with the liquid crystal effectively.

Figure 6:
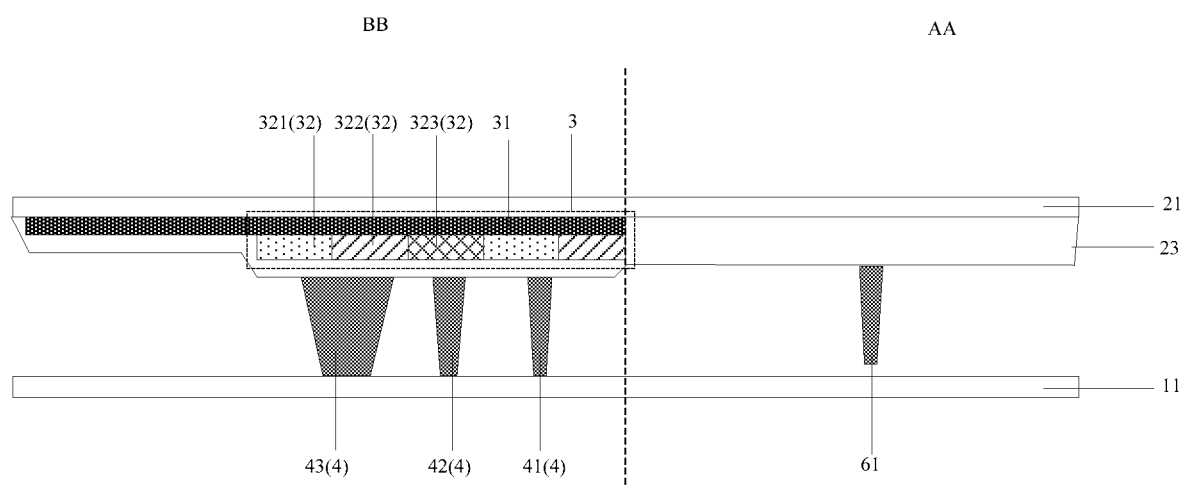
FIG. 6 is a schematic sectional view of a display panel including first auxiliary spacers according to an embodiment of the present disclosure.

In some embodiments, with reference to FIG. 6, a side of the second substrate 21 facing the first substrate 11 is provided with a plurality of first auxiliary spacers 61 in the display area AA. The support bars 4 and the first auxiliary spacers 61 are located in the same layer and made of the same material. In an embodiment of the present disclosure, the support bars 4 and the first auxiliary spacers 61 are located in the same layer and made of the same material, such that when the first auxiliary spacers 61 in the display area are made, the support bars 4 may be formed through the same mask process. Each support bar 4 may have the same height as each first auxiliary spacer 61, such that a process of making a display panel may be simplified. In addition, the support bars 4 are formed when the first auxiliary spacers 61 rather than main spacers are made such that a situation that if the support bar 4 having the same height as the main spacer is used, an overall support height in the frame area BB is greater than a support height in the display area AA, thereby causing other unnecessary influences may be avoided.

Figure 7:
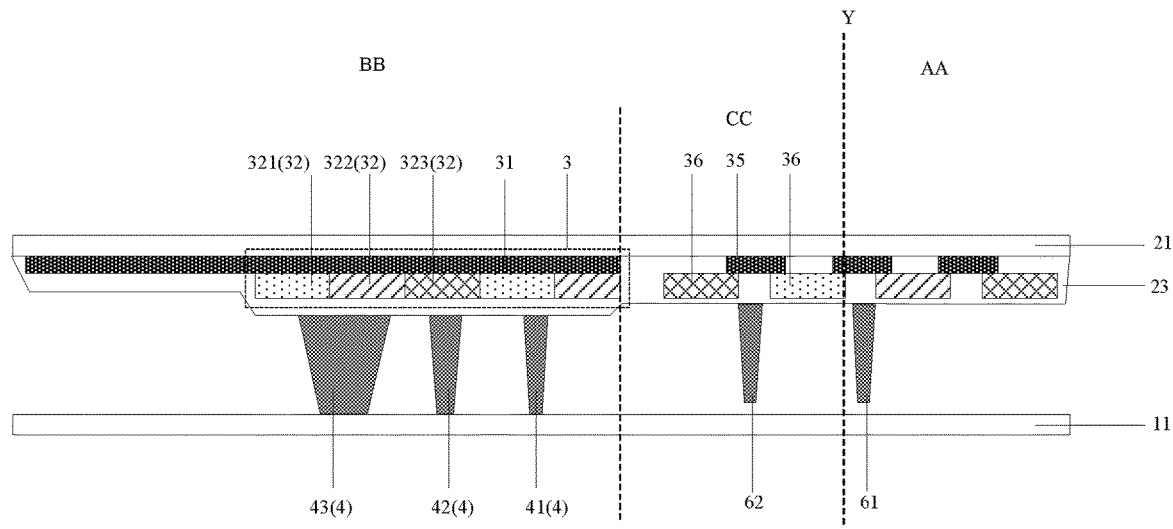
FIG. 7 is a schematic sectional view of a display panel including second auxiliary spacers according to an embodiment of the present disclosure.
Figure 8:
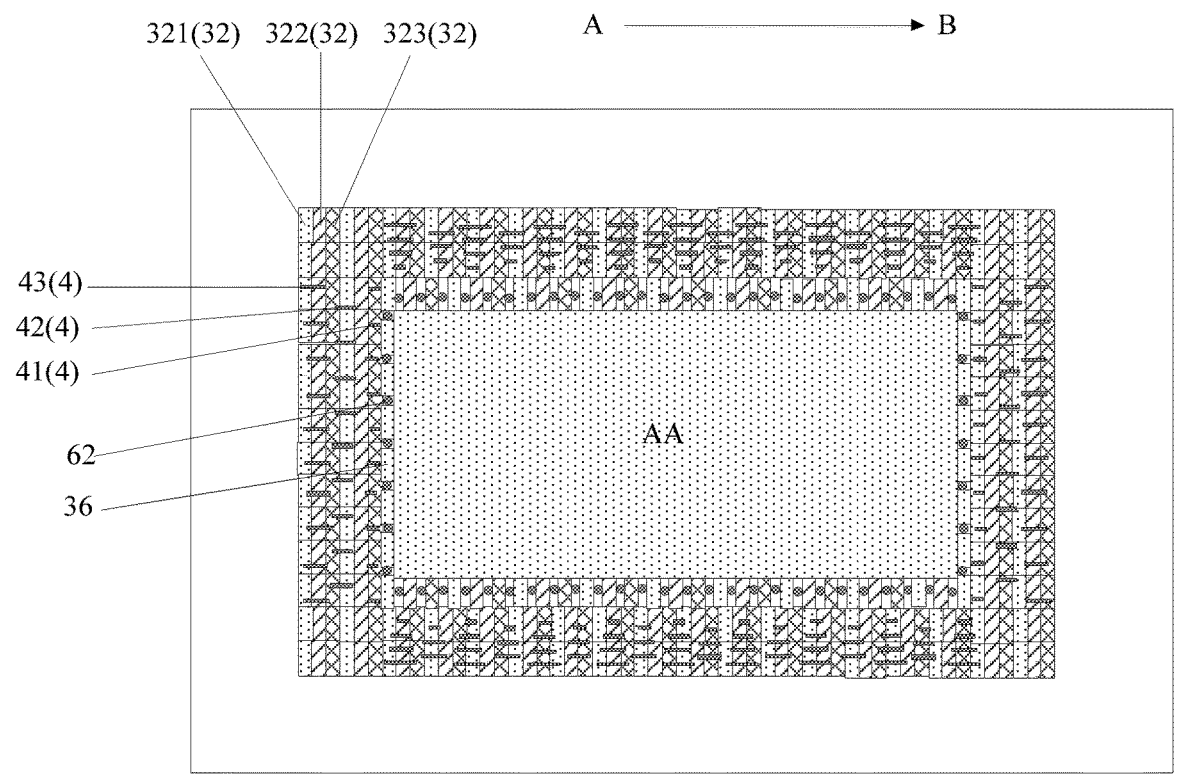
FIG. 8 is a schematic top view of a display panel including second auxiliary spacers according to an embodiment of the present disclosure.
Figure 10:
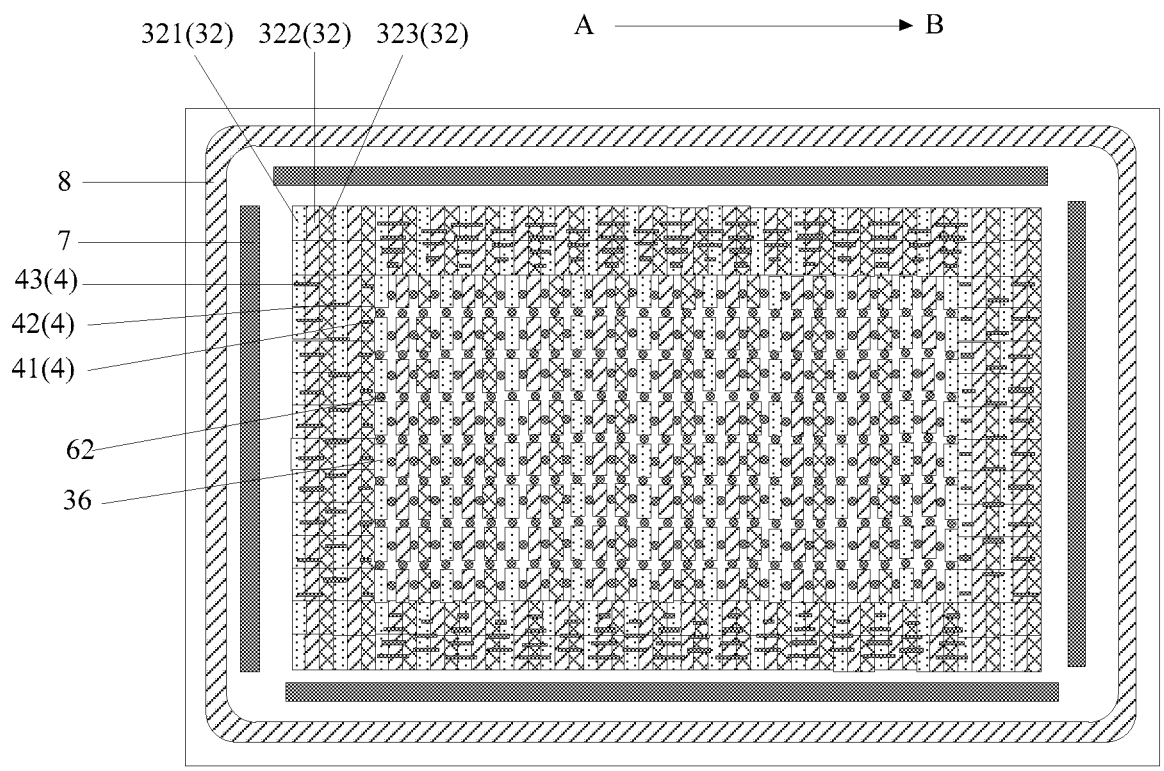
FIG. 10 is a schematic top view of a display panel including a barrier wall according to an embodiment of the present disclosure.

In some embodiments, with reference to FIGS. 7 and 8, the second substrate 21 is further provided with a plurality of second color resist portions 36 that are located in the same layer as the first color resist portion 32 and in an area (such as a CC area in FIG. 7) between an area in which the first color resist portion 32 is provided and the display area AA, second black matrices 35 between adjacent second color resist portions 36, and second auxiliary spacers 62 on sides of the second color resist portions 36 facing the first substrate 11. That is, the second color resist portions 36, the second black matrices 35 and the second auxiliary spacer 62 are located in the frame area BB at a side close to the display area AA (in FIG. 7, a dotted line Y is a boundary between the display area AA and the frame area BB), and orthographic projections of the second black matrices 35 on the first substrate 11 cover orthographic projections of the second auxiliary spacers 62 on the first substrate 11. In an embodiment of the present disclosure, the frame area BB is further provided with the second color resist portions 36, the second black matrices 35, and the second auxiliary spacers 62, a positional relation for mutual arrangement of which may be the same as that of the color resists, the black matrix, and the first auxiliary spacers in the display area AA. That is, the color resists, the black matrix and the first auxiliary spacers in the display area AA are extended to the frame area BB (which is as shown in FIG. 10, FIG. 10 being a schematic diagram showing color resists and spacers in the display area AA), a tolerance of an alignment error generated when the first substrate is aligned with the second substrate is improved. That is, even if the first substrate 11 is not strictly aligned with the second substrate 21 according to preset positions, the second color resist portion 36 outside the display area AA may also perform the light filtration, so as to prevent the problem that a peripheral area of the display area AA may not be normally used for display. It should be noted that in FIG. 8, an example in which a circle of second color resist portions 36 and second auxiliary spacers 62 are arranged in the display area AA is used for illustration. In some embodiments, the number of the second color resist portions 36 and the second auxiliary spacers 62 may be set as required, which is not limited in an embodiment of the present disclosure.

In some embodiments, the second auxiliary spacers 62 and the first auxiliary spacers 61 are in the same layer and made of the same material. In some embodiments, the second auxiliary spacers 62 may be in the same shape and have the same height as the first auxiliary spacers 61. In an embodiment of the present disclosure, the second auxiliary spacers 62 and the first auxiliary spacers 61 are in the same layer and made of the same material, such that the second auxiliary spacers 62 may be formed when the first auxiliary spacers 61 in the display area are made, thereby simplifying a process of making a display panel.

Figure 9:
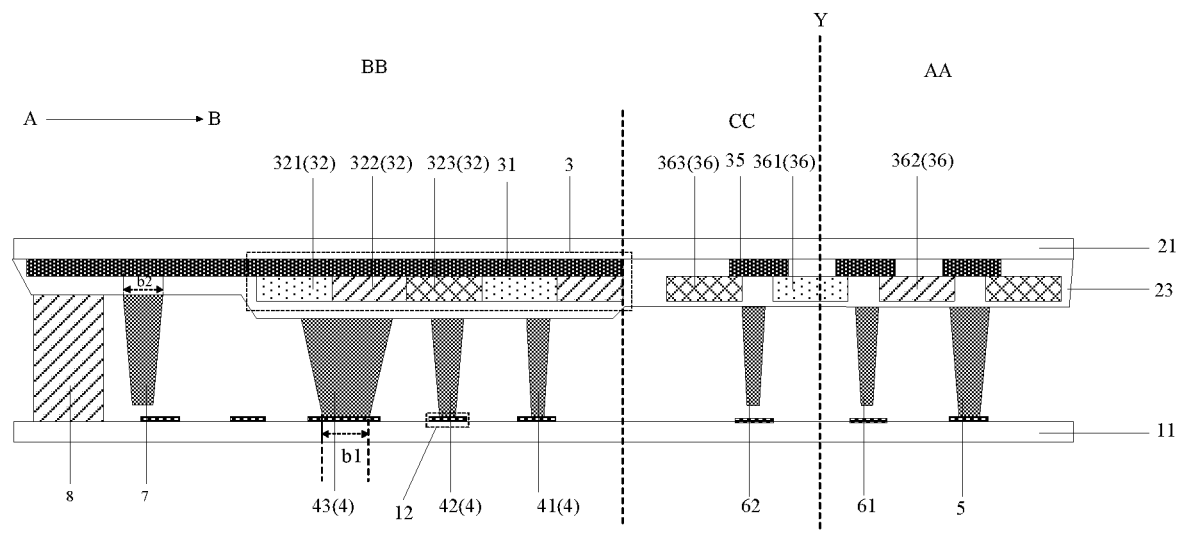
FIG. 9 is a schematic sectional view of a display panel including a barrier wall according to an embodiment of the present disclosure.

In some embodiments, with reference to FIGS. 9 and 10, a side of the second substrate 21 facing the first substrate 11 is provided with a plurality of main spacers 5 in the display area AA. The side of the second substrate 21 facing the first substrate 11 is provided with a barrier wall 7 surrounding the first color resist portion 32 in the frame area BB, and the barrier wall 7 is interrupted at a corner. The barrier wall 7 and the main spacers 5 are located in the same layer and made of the same material. In an embodiment of the present disclosure, the frame area BB is provided with the barrier wall 7, so as to block exudates of a sealant 8 for sealing the first substrate 11 and the second substrate 21, and prevent the situation that the exudates expand into the display area to affect normal display of the display area. In addition, the barrier wall 7 and the main spacer 5 are located in the same layer and made of the same material, such that the barrier wall 7 may be formed when the main spacers 5 in the display area are made, thereby simplifying a process of making a display panel. In addition, the barrier wall 7 is interrupted at corners, such that flowing of liquid crystal at these positions may be facilitated, so as to effectively fill the corners.

In some embodiments, with reference to FIG. 9, a minimum length of the support bar 4 (for example, a third support bar 43 in FIG. 9) adjacent to the barrier wall 7 in the first direction AB is greater than a maximum length of the main spacer 5 in the first direction AB. For example, sections that are perpendicular to the first substrate 11 and parallel to the first direction AB of the support bars 4 and the main spacers 5 are trapezoidal, the minimum length of the support bar 4 (for example, the third support bar 43 in FIG. 9) adjacent to the barrier wall 7 is a length b1 of a lower side of a trapezoid in FIG. 9, the maximum length of the main spacer 5 in the first direction AB is a length b2 of an upper side of the trapezoid, and then b1>b2. In an embodiment of the present disclosure, the minimum length of the support bar 4 adjacent to the barrier wall 7 in the first direction AB is greater than the maximum length of the main spacer 5 in the first direction AB such that supporting strength for the frame area BB may be increased.

In some embodiments, with reference to FIGS. 9 and 10, the frame area BB between the second substrate 21 and the first substrate 11 is further provided with a sealant 8 surrounding the barrier wall 7.

Figure 11:
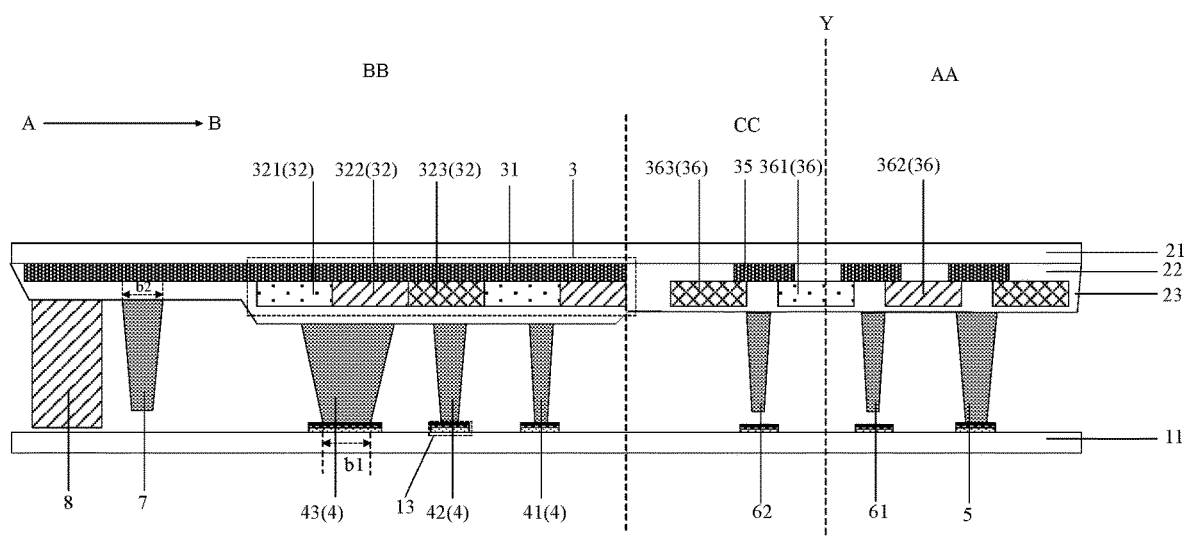
FIG. 11 is a schematic sectional view of a display panel with support bars located in an area on which stacked metal is located according to an embodiment of the present disclosure.

In some embodiments, orthographic projections of the support bars 4 on the first substrate 11 are located in an area in which single-layer metal 12 of the first substrate 11 is located, which is as shown in FIG. 9; or orthographic projections of the support bars 4 on the first substrate are located in an area in which stacked metal 13 of the first substrate is located, which is as shown in FIG. 11. In an embodiment of the present disclosure, a thickness of the first substrate 11 at positions where the support bars 4 are in contact with the first substrate 11 is consistent, so as to prevent the problem that if thicknesses of a film layer at positions where the support bars 4 are in contact with the film are different, supporting strength for different positions is not uniform. In some embodiments, the area in which the single-layer metal 12 is located may be an area in which a single-layer signal line is located, such as an area in which a single-layer gate line or a single-layer data line is located; the area in which the stacked metal 13 is located may be an area in which two or more layers of signal lines are stacked, such as a position where gate lines or data lines are stacked, and an insulation layer may be arranged between the stacked metal 13.

An embodiment of the present disclosure further provides a display apparatus. The display apparatus includes the display panel provided in an embodiment of the present disclosure.

Embodiments of the present disclosure have the following beneficial effects: in an embodiment of the present disclosure, the frame area is provided with the color resist structure surrounding the display area, the color resist structure includes the first black matrix and the first color resist portion arranged in stack, and each of the support bars stands between the color resist structure and the first substrate, as such, a height of each support bar in the frame area and a height of the first black matrix and a height of the first color resist portion are added, so as to solve the problem lack of effective support due to a gap between the first substrate and the second substrate in the frame area being large a. In the case of a conventional display panel, when a barrier wall in a frame area is used for support, the barrier wall in the frame area and main spacers in a display area are integrally formed and have the same height, but the main spacers in the display area and the barrier wall in the frame area are at different positions (distribution of a film layer at different positions is different). Thus, a second substrate may be in contact with a first substrate by means of the main spacers in the display area to effectively support display, but the second substrate may not be in contact with the first substrate by means of the barrier wall in the frame area such that the frame area may not be effectively supported, and further the frame area will be deformed when pressed, thereby causing a problem of light leakage. Compared with the conventional display panel, the display panel in an embodiment of the present disclosure allows the effective support in the frame area by arranging the color resist structure and the support bars in the frame area, and therefore the problem of peripheral light leakage of the display panel is solved.

Obviously, a person skilled in the art can make various amendments and variations to the present disclosure without departing from the spirit and scope of the present disclosure. In this way, it is intended that the present disclosure also encompasses these amendments and variations if these amendments and variations to the present disclosure fall within the scope of the claims of the present disclosure and the equivalents thereof.

What is claimed is:

1. A display panel, comprising:
a first substrate and a second substrate opposite to each other, wherein a display area and a frame area surrounding the display area are arranged between the second substrate and the first substrate;
a color resist structure in the frame area on a side of the second substrate facing the first substrate and surrounding the display area, wherein the color resist structure comprises a first black matrix and a first color resist portion disposed in stack; and
a plurality of support bars surrounding the display area, wherein each of the support bars stands between the color resist structure and the first substrate;
wherein in a direction from the frame area to the display area, lengths, in a first direction, of ends of the support bars facing away from the first substrate sequentially decrease; and wherein the first direction is parallel to an extension direction of horizontal lengths of the ends of the support bars facing away from the first substrate on the first substrate.

2. The display panel according to claim 1, wherein the support bars comprise a plurality of support bar groups sequentially arranged in the first direction, and the support bars of every two adjacent support bar groups are arranged alternatively in a direction perpendicular to the first direction.

3. The display panel according to claim 1, wherein the plurality of support bars surrounding the display area are interrupted at corners of the frame area.

4. The display panel according to claim 1, wherein the first color resist portion is of an integrated single-color structure.

5. The display panel according to claim 1, wherein the first color resist portion comprises: a plurality of different single-color color resist portions sequentially arranged and in connection.

6. The display panel according to claim 4, further comprising:
an alignment film for alignment in a first direction disposed between a layer with the first color resist portion and a layer with the support bars;
wherein a length of an orthogonal projection of each support bar on the first substrate in the first direction is greater than that in a direction perpendicular to the first direction.

7. The display panel according to claim 6, further comprising:
a plurality of first auxiliary spacers on the side of the second substrate facing the first substrate in the display area;
wherein the support bars and the first auxiliary spacers are disposed in a same layer and made of same material.

8. The display panel according to claim 7, wherein the second substrate is further provided with a plurality of second color resist portions in a same layer as the first color resist portion and between an area in which the first color resist portion is located and the display area, second black matrices between adjacent second color resist portions, and second auxiliary spacers on sides of the second color resist portions facing the first substrate; and
orthographic projections of the second black matrices on the first substrate cover orthographic projections of the second auxiliary spacers on the first substrate.

9. The display panel according to claim 8, wherein the second auxiliary spacers and the first auxiliary spacers are disposed in a same layer and made of same material.

10. The display panel according to claim 7, further comprising:

a plurality of main spacers on the side of the second substrate facing the first substrate and in the display area; and a barrier wall surrounding the first color resist portion on the side of the second substrate facing the first substrate and in the frame area, wherein the barrier wall is interrupted at corners of the frame area;

wherein the barrier wall and the main spacers are disposed in a same layer and made of same material.

11. The display panel according to claim 10, wherein a minimum length of the support bar adjacent to the barrier wall in the first direction is greater than a maximum length of the main spacer in the first direction.

12. The display panel according to claim 10, further comprising:

a sealant surrounding the barrier wall in the frame area between the second substrate and the first substrate.

13. The display panel according to claim 6, further comprising:

a planarization layer between the layer with the first color resist portion and a layer with the alignment film.

14. The display panel according to claim 1, wherein orthographic projections of the support bars on the first substrate each is located in an area in which single-layer metal of the first substrate is located; or orthographic projections of the support bars on the first substrate each is located in an area in which stacked metal of the first substrate is located.

15. A display apparatus, comprising a display panel, wherein the display panel comprises:

a first substrate and a second substrate opposite to each other, wherein a display area and a frame area surrounding the display area are arranged between the second substrate and the first substrate;

a color resist structure in the frame area on a side of the second substrate facing the first substrate and surrounding the display area, wherein the color resist structure comprises a first black matrix and a first color resist portion disposed in stack; and a plurality of support bars surrounding the display area, wherein each of the support bars stands between the color resist structure and the first substrate;

wherein in a direction from the frame area to the display area, lengths, in a first direction, of ends of the support bars facing away from the first substrate sequentially decrease; and wherein the first direction is parallel to an extension direction of horizontal lengths of the ends of the support bars facing away from the first substrate on the first substrate.

16. The display apparatus according to claim 15, wherein the support bars comprise a plurality of support bar groups sequentially arranged in the first direction, and the support bars of every two adjacent support bar groups are arranged alternatively in a direction perpendicular to the first direction.

17. The display apparatus according to claim 15, wherein the plurality of support bars surrounding the display area are interrupted at corners of the frame area.

18. The display apparatus according to claim 15, wherein the first color resist portion is of an integrated single-color structure.

* * * * *